Patented Aug. 1, 1933

1,920,246

UNITED STATES PATENT OFFICE 1,920,246

PREPARATION OF ALKYL HALIDES

Herbert Wilkins Daudt, Wilmington, Del., assignor to E. I. Du Pont de Nemours & Company, Wilmington, Del., a Corporation of Delaware No Drawing. Application June 6, 1930.
Serial No. 459,616

15 Claims. (Cl. 260—166.)

This invention relates to the production of alkyl halides and more particularly to the preparation of such compounds by the treatment of mixed vapors of a hydrohalide and an alcohol with catalysts.

Sabatier and Mailhe (Compt. rend., 169, 122, 1919) by passing a mixture of the vapor of individual higher alcohols and hydrochloric acid gas over alumina heated to 370°–450° C., obtained a product which contained some alkyl halide along with the unsaturated compounds produced. They did not obtain satisfactory results from alcohols containing less than three carbon atoms. Although they anticipated the formation of some methyl and ethyl chlorides, by their process they did not attempt to prepare these particular compounds because of the attendant formation of ethers and unsaturated compounds.

Parravano and Malquori (Atti. Accad. Lincei 7, 970, 1928) have stated that $Al_2O_3.3H_2O$ when heated shows breaks at 190° C., 270° C. and 450° C., indicating changes to the compounds $Al_2O_3.2H_2O$, $Al_2O_3.H_2O$ and $Al_2O_3$ respectively.

This latter disclosure being correct, it would indicate that Sabatier and Mailhe were using a material made up of $Al_2O_3$, $Al_2O_3.H_2O$, or both. Under their conditions the compound $Al_2O_3.2H_2O$ could not exist.

Dachlauer and Eggert (German Patent 441,747 of March 10th, 1927) have used carbon granules treated with phosphoric acid as an ethyl-chloride catalyst.

It is an object of this invention to devise a new process for the preparation of alkyl halides. Further objects are to produce new catalysts, to produce catalysts in new forms, and in general to improve the prior art. Other objects will appear hereinafter.

These objects are accomplished by the present invention according to which alkyl halides are produced by passing mixtures of alcohol vapor and hydrogen halide gas over oxygen containing catalysts capable of dehydrating an alcohol. Preferably, the catalyst is in the form adapted to withstand the rapid passage of gases thereover. The invention will be readily understood from consideration of the following examples:

Example I

Hydrated aluminum oxide was placed on a suitable carrier and inserted in a cement lined converter. The catalyst was then heated to a temperature of 260°–280° C. While maintaining this temperature equimolecular proportions of hydrochloric acid gas and ethyl alcohol vapor were passed over the catalyst. The effluent vapors were then conducted through a water cooled condenser maintained above the boiling point of ethyl chloride. The vapors were then passed through a caustic scrubber into a drying tower. Various drying agents are suitable for this step in the process but if sulfuric acid is used in the drying tower any ethers and some of the olefines formed in the process are absorbed and thereby eliminated from the gaseous product of the reaction. After leaving the drying tower the vapors were passed into a brine cooled condenser to condense the ethyl chloride. Approximately 1.1 parts of ethyl chloride were obtained for every part of ethyl alcohol used.

Hydrated aluminum oxide in the form usually supplied to the trade is a light, fluffy powder and is not well suited for use in this reaction wherein vapors are ordinarily passed rapidly over the catalyst surface. It is therefore desirable to prepare the catalyst in a form more suited to such a process as herein employed. This has been done by producing the catalyst in the form of small pellets. In the preparation of the catalyst in this form the dry powder may be compacted by high pressure or may be mixed with an inorganic binding or cementing agent. In the latter case the slightly pasty product resulting from mixing a binding agent and the catalyst may be pressed into a mold or extruded through a die in any desired form. The catalyst thus molded is usually dried, whereupon it is ready for service. The preparation of the catalyst in this form will be readily understood from a consideration of the following example:

Example II

Fifteen (15) parts of hydrated aluminum oxide were intimately mixed with 10 parts of 40° Bé. sodium silicate solution. The resultant mixture was pressed by means of a die into small pellets one-fourth inch in diameter by one-eighth inch in thickness. These pellets were then dusted with the powdered hydrated aluminum oxide and allowed to dry at atmospheric temperature for eight hours, after which they were dried at 175° for twelve hours. The catalyst was then ready for use in the process for the preparation of alkyl halides as described above.

Example III

Fifteen (15) parts of hydrated aluminum oxide were intimately mixed with 10 parts of 40° Bé. sodium silicate solution. The resultant mixture was extruded through a die into lengths about one-eighth inch in diameter. These lengths were then dusted with the powdered hydrated aluminum oxide and allowed to dry at atmospheric temperature for eight hours, after which they were dried at 175° for twelve hours. The catalyst was then ready for use in the process for the preparation of alkyl halides as described above.

The catalyst prepared as above described is hard, compact, and can be used indefinitely for the preparation of alkyl chlorides.

The preparation of the catalyst in pellets or lengths may be varied over a wide range. It is only necessary to have the mixture of such a consistency that it can be worked into the desired physical form. Bodies of the catalyst molded without the use of pressure are suitable for the successful operation of this process. It is not necessary that the particles be of uniform size or of any particular size. Widely varying shapes and sizes may be used. The procedure for drying may be varied as desired, another example being the use of the catalyst as soon as molded.

Inorganic binders other than sodium silicate may be used or mixtures of binders may be used. The desirable features of a binding material are, first, that it should maintain its efficacy under the temperature conditions of the process and; second, that it should not adversely influence the conversion reaction for which the catalyst is used. Phosphoric acid has been effectively used in the place of the sodium silicate. Its use is described in the following example:

Example IV

Hydrated aluminum oxide was mixed with sufficient (85%) phosphoric acid to cause the particles to adhere to each other. The mass was then formed into small pellets and dried at 270° C., after which they were ready for use.

Other alkali metal silicates than that of sodium may be used, for example, potassium silicate is suitable.

The invention is not limited to hydrated aluminum oxide. In general oxides or oxygen containing inorganic salts which have the property of causing dehydration of an alcohol are suitable, more particularly, the oxygen containing compounds of the metals of groups III and IV of the periodic table (for example, that in the Handbook of Chemistry and Physics, 12th edition, 1927, pages 474-475). Excellent results are obtainable with compounds embodying thorium, zirconium, titanium and aluminum. Oxides or sulphates of these metals, in particular, may be used. Preferably, hydrated aluminum oxide is used. Special mention may also be made of aluminum sulphate ($Al_2(SO_4)_3$). The term oxide is used broadly to cover both hydrated and anhydrous oxides, where it is intended to cover either to the exclusion of the other, its full name is employed.

The temperatures of the conversion of the alcohol-vapor-hydrogen-halide-gas-mixture to alkyl halides may vary widely, but preferably temperatures below 370° C. (the temperature utilized by Sabatier and Mailhe) are used in order to decrease the formation of unsaturated or ether compounds. As the temperature is progressively decreased, it has been found that the proportions of such compounds is lessened until at approximately 300° C. the formation of such undesirable compounds is a minor factor and at temperatures below this their formation is almost negligible. Ordinarily temperatures over 325° C. are not used in this process. While the preferred range is 260°–280° C., it is to be understood that lower temperatures may be used, but at the expense of the formation of alkyl halides; the conversion being incomplete at such temperatures. The process when operated at about 220° C., gave a yield of ethyl chloride which was approximately 40% of the theoretical.

It is not necessary that the alcohol be anhydrous since water is formed in the reaction, and if water were carried into the reaction chamber it would be driven off with that liberated in the process.

This process is especially suitable for alcohols containing up to four carbon atoms.

The process is not limited to chlorides, but is applicable also to bromides.

The hydrochloric acid may be used in proportions which are molecularly less than, equal to, or greater than the amount of alcohol used. Any tendency to the formation of ethers is lessened by using an equivalent or excess amount of hydrochloric acid gas.

It is to be understood that the term "hydrated oxide catalyst" as used herein is to be considered as covering hydroxide catalysts. Under certain systems of nomenclature these oxide compounds may be considered to be hydroxides. If the work of Parravano and Malquori is correct, under the most favorable conditions which this process operates the major portion of the hydrated aluminum oxides present would be the dihydrate (that is, $Al_2O_3.2H_2O$) with some of the monohydrate $Al_2O_3.H_2O$ present. No anhydrous aluminum oxide could be formed under the conditions herein utilized. It may be noted here that the temperatures employed by this invention are conducive to the formation of ether and not to that of ethylene when the alcohol alone is passed over the catalyst. The temperatures, at which the monohydrate and anhydrous aluminum oxide are formed, favor conversion of ethyl alcohol to ethylene.

With proper insulation of the converter it has been found that the heat of the reaction is sufficient to maintain the desired working temperatures. Other advantages of this process are that the catalyst is substantially non-poisoning when used with the materials commercially available, that the catalyst is not fragile but may be formed into physically strong bodies, and that little or no unsaturated hydrocarbons or ethers are formed in its use.

As many apparently widely different embodiments of this invention may be made without departing from the spirit thereof, it is to be understood that I do not limit myself to the foregoing examples or descriptions except as indicated in the following patent claims.

I claim:

1. The process comprising passing ethyl alcohol vapors and hydrochloric acid gas over hydrated aluminum oxide at about a temperature of 250° C.–310° C., passing the resulting vapors through a condenser held at a temperature above the boiling point of ethyl chloride but below the boiling point of water, then passing the remaining vapors through a caustic scrubber and then through a drying tower.

2. The process of forming ethyl chloride comprising passing mixed vapors of ethyl alcohol and hydrogen chloride over the oxide of a metal of groups III and IV of the periodic table capable of dehydrating an alcohol previously heated to a temperature at which the ethyl alcohol and hydrogen chloride will react to form ethyl chloride, in a container so insulated that the heat liberated by the reaction maintains the temperature of the catalyst between 200° C. and 325° C.

3. The process of forming ethyl chloride comprising passing a mixture of ethyl-alcohol vapor and hydrochloric acid gas over hydrated aluminum oxide previously heated to a temperature at which the ethyl alcohol and hydrogen chloride will react to form ethyl chloride in a container so insulated that the heat liberated during the reaction maintains the aluminum oxide at a temperature of 250°–310° C.

4. The process which comprises treating ethyl alcohol with hydrogen chloride in the presence of hydrated aluminum oxide maintained at a temperature of substantially 200–325° C.

5. The process which comprises treating an alcohol having less than three carbon atoms with hydrogen chloride in the presence of hydrated aluminum oxide maintained at a temperature of substantially 200–325° C.

6. The process which comprises treating an aliphatic monohydroxy alcohol with hydrogen chloride in the presence of hydrated aluminum oxide maintained at a temperature of substantially 200–325° C.

7. The process which comprises treating an aliphatic monohydroxy alcohol with hydrogen chloride in the presence of alumina maintained at a temperature of substantially 260–280° C.

8. The process which comprises treating an aliphatic monohydroxy alcohol with hydrogen chloride in the presence of a solid alcohol-dehydrating metal oxide maintained at a temperature of substantially 260–280° C.

9. The process which comprises treating an aliphatic monohydroxy alcohol with hydrogen chloride in the presence of an oxygen containing derivative of a metal of the group consisting of thorium, zirconium, titanium and aluminum maintained at a temperature of substantially 260–280° C.

10. The process which comprises treating an aliphatic monohydroxy alcohol with hydrogen chloride in the presence of an oxygen containing derivative of a metal of groups III and IV of the periodic table maintained at a temperature of substantially 260–280° C.

11. The process which comprises treating ethyl alcohol with hydrogen chloride in the presence of alumina maintained at a temperature of substantially 270° C.

12. The process which comprises treating ethyl alcohol with hydrogen chloride in the presence of alumina maintained at a temperature of substantially 260–280° C.

13. The process which comprises treating ethyl alcohol with hydrogen chloride in the presence of alumina maintained at a temperature of substantially 250–310° C.

14. The process which comprises treating ethyl alcohol with hydrogen chloride in the presence of alumina maintained at a temperature of substantially 200–325° C.

15. The process of forming alkyl-halides containing less than three carbon atoms which comprises passing the corresponding alcohol and hydro-halide over hydrated aluminum oxide previously heated to 250°–325° C. and so insulating the reaction vessel that the aforesaid temperature is maintained without the addition of extraneous heat.

HERBERT W. DAUDT.